United States Patent [19]

Arnold

[11] Patent Number: 4,536,175

[45] Date of Patent: Aug. 20, 1985

[54] METHOD AND APPARATUS FOR MAKING IMPROVED END-CLOSURES FOR SHIRRED TUBULAR CASINGS

[75] Inventor: Lionel C. Arnold, Columbia, S.C.

[73] Assignee: Teepak, Inc., Oak Brook, Ill.

[21] Appl. No.: 501,669

[22] Filed: Jun. 6, 1983

[51] Int. Cl.³ ............................................. A22C 13/00
[52] U.S. Cl. ........................................ 493/308; 17/34; 53/370; 53/483; 493/464
[58] Field of Search ............... 53/483, 576, 577, 370; 493/156, 308, 464; 17/33, 34

[56] References Cited

U.S. PATENT DOCUMENTS

| | | | |
|---|---|---|---|
| 3,162,893 | 12/1964 | Townsend | 17/34 |
| 3,274,005 | 9/1966 | Alsys | 99/176 |
| 3,570,045 | 3/1971 | Matecki | 17/34 |
| 3,865,954 | 2/1975 | Tums et al. | 426/140 |
| 3,914,447 | 10/1975 | Tums et al. | 426/390 |
| 4,070,729 | 1/1978 | Tums et al. | 17/34 |
| 4,075,938 | 2/1978 | Martinek | 493/156 X |

FOREIGN PATENT DOCUMENTS

WO81/00041  1/1981  PCT Int'l Appl. .
1082222  9/1967  United Kingdom .

Primary Examiner—James F. Coan
Attorney, Agent, or Firm—Michael L. Dunn; Howard M. Ellis

[57] ABSTRACT

Closures for shirred tubular food casings comprise a wound end-closure plug positioned entirely inside the casing bore followed by inverted casing wall tapered into the shape of a truncated cone, said closures providing significantly stronger, more resistant means for reducing the incidence of casing blow-out during filling operations.

22 Claims, 17 Drawing Figures

U.S. Patent  Aug. 20, 1985  Sheet 1 of 3  4,536,175
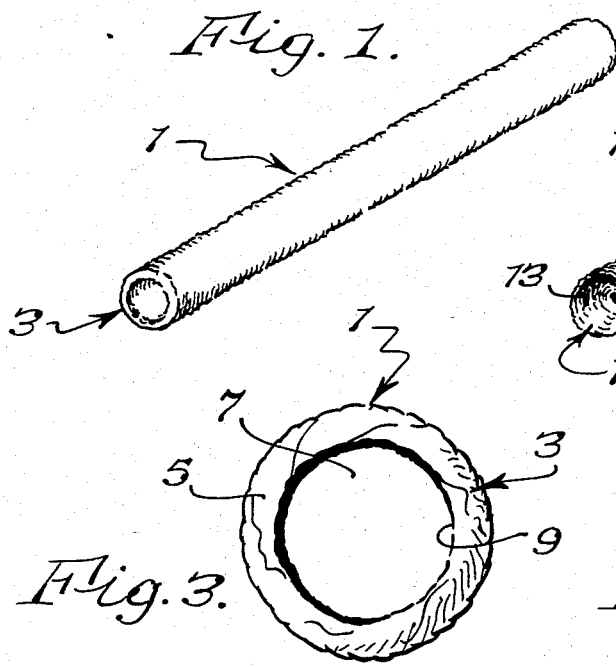
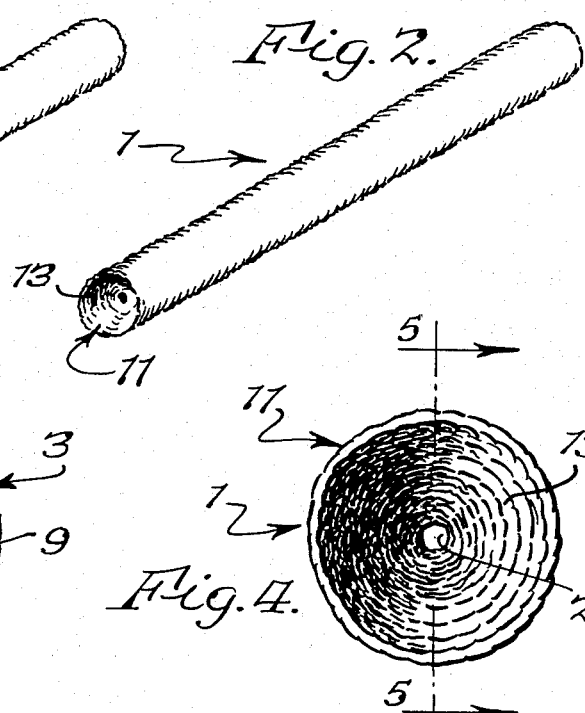
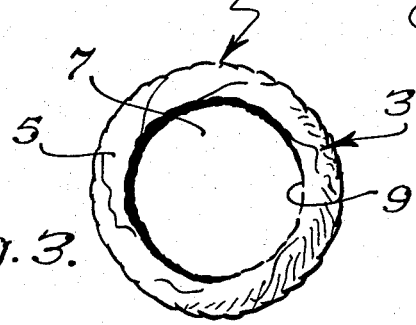
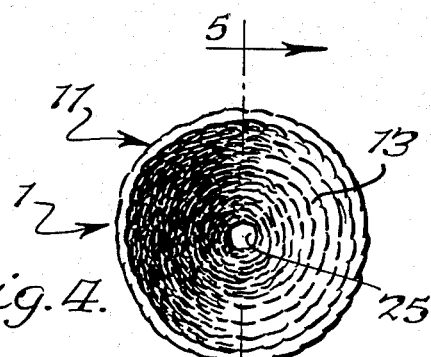
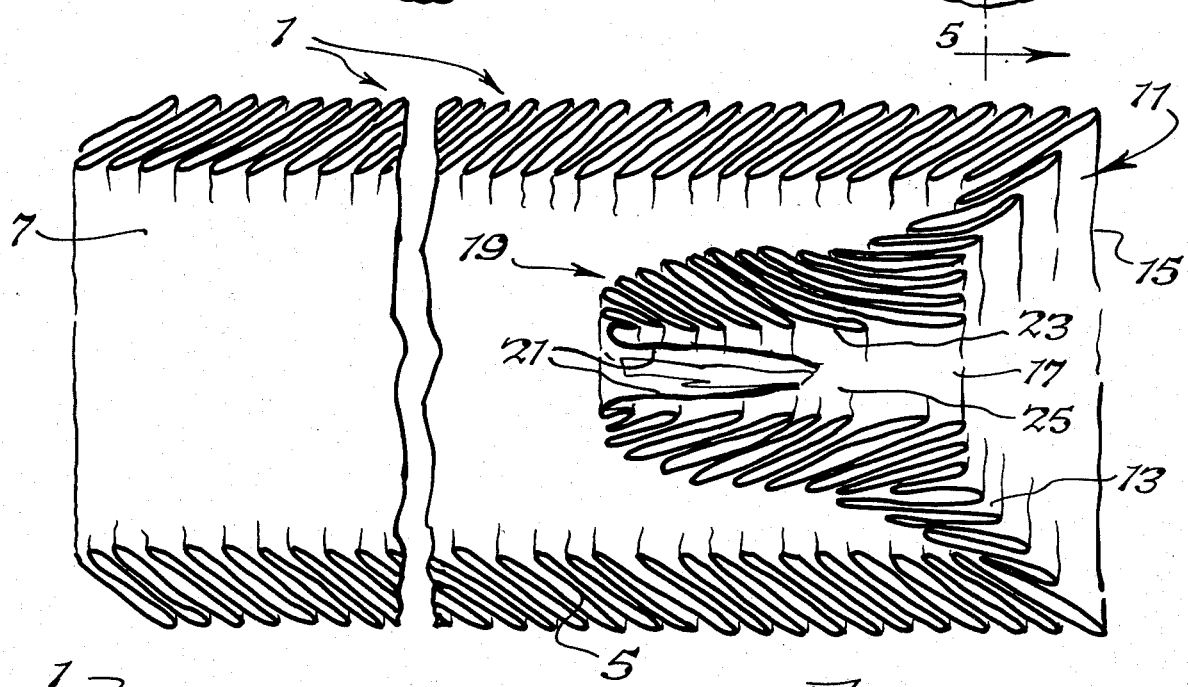
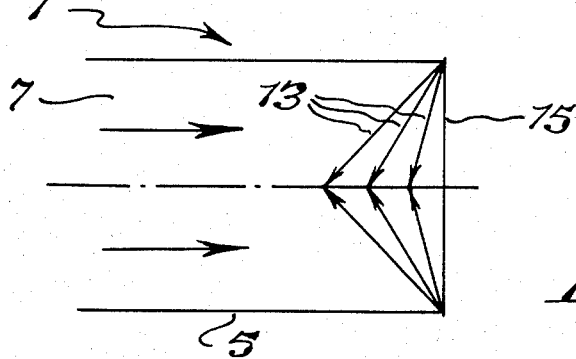

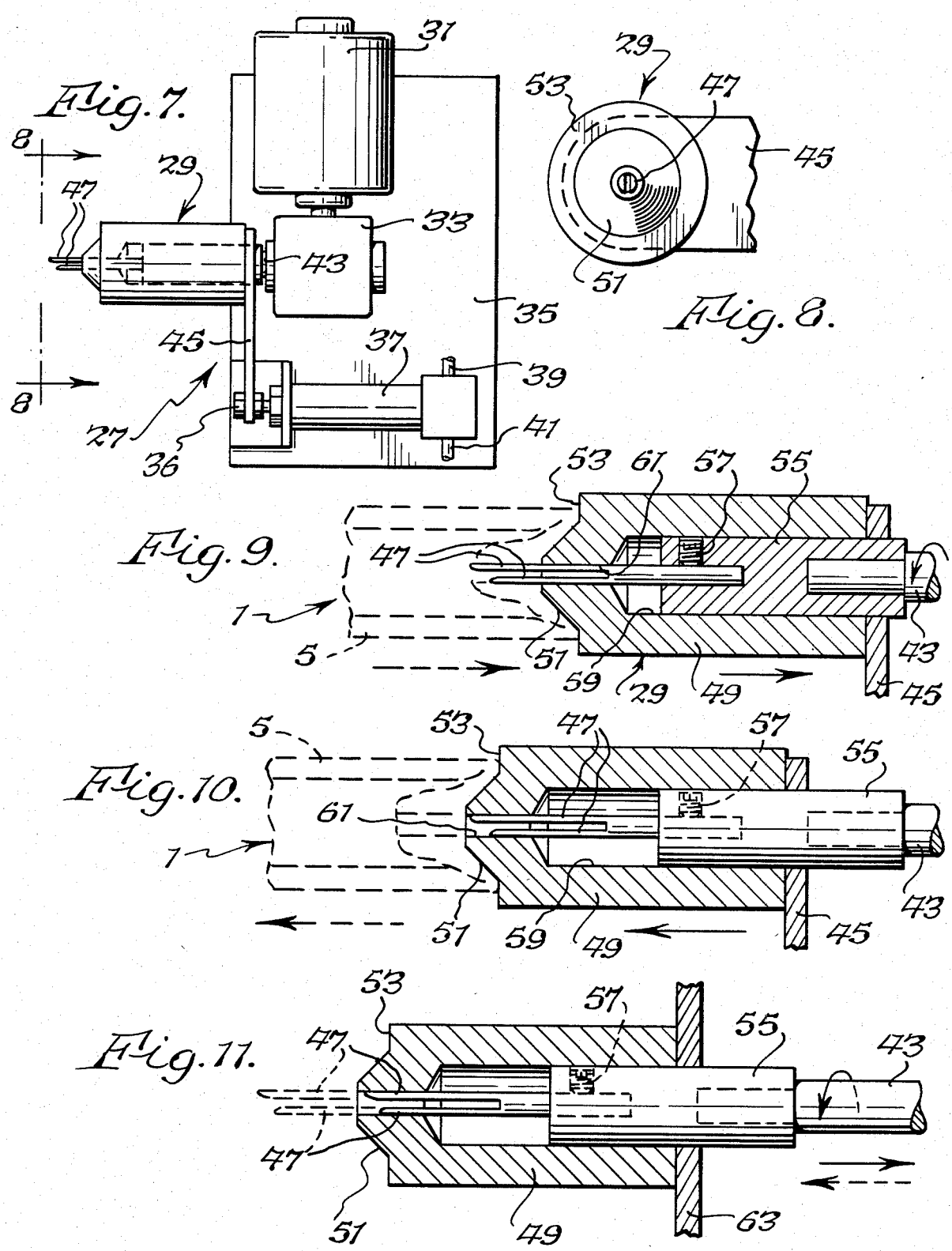

METHOD AND APPARATUS FOR MAKING IMPROVED END-CLOSURES FOR SHIRRED TUBULAR CASINGS

BACKGROUND OF THE INVENTION

This invention relates to new and useful improvements in shirred synthetic sausage casings, and more particularly, to the closure of the end of a shirred sausage casing.

Casings, especially those prepared from collagen, are manufactured as hollow, thin-walled tubes of great length. For convenience in handling and in filling collagen casings are shirred from lengths of 60 feet or more down to a shirred and compressed length of several inches.

After tubular casings are shirred they are packaged and shipped, for example, to meat packaging houses where individual shirred strands are automatically fed onto stuffing horns and pressurized meat emulsion extruded into the casings to their fully extended lengths.

Heretofore, when food casings were stuffed manually the operator would simply deshirr a short length of casing from an end thereof and effect the closure preventing the meat emulsion extruding into the shirred casing from being lost from the open end. In the case of automated filling equipment the high speed of such operations dictates that the end closure or plug in the casing be formed during manufacture of the casing per se, rather than during filling operations.

The incidents of end-closure failure with preformed closures is not uncommon. High speed automated filling operations can lead to end-closure "blow-out" or unwinding of the closure due to impact occurring, for example, when the casing is fed onto the horn of a filling machine. The shock created by such impact increases the risk of end-closure failure. Similar problems can occur if the end-closure plug is not centered in the bore of the strand. When the filling horn on certain equipment indexes in a strand with the plug not centered it is likely to blow out the end of the strand when filling commences. Accordingly, there is a need for an improved method and apparatus for making end-closures on shirred tubular casings which will have a lower incidence of failure when used in conjunction with high speed automated filling equipment.

The present invention provides for a more dependable end-closure on shirred tubular food casings and means for so accomplishing. The improved method of the present invention provides for positioning the end closing plug completely inside the bore of the shirred strand, rather than extending to the terminal end of the strand. By recessing the plug within the bore of the strand followed by conical shaped inverted casing at the terminus of the strand a cushioning or shock absorbing affect is created reducing the incidents of end-closure failure during filling operations. The conical shaped arbor or nose section of the improved end-closure apparatus provides the means for centering the tip of the end-closure plug in the bore of the casing strand.

In addition to the foregoing, the end-closure method of the present invention utilizes up to 50% less casing material in affecting a strand closure than previous methods. Because the end closure is self regulating the length of casing in the closure is constant and not sensitive to the number of turns of the arbor.

Thus, it is one principal object of the present invention to provide a new and improved method of closing the fore-end of a shirred strand of food casing.

It is a further object of the present invention to provide an improved apparatus for making centered and recessed end-closures on food casings that have a lower incidence of failure during filling operations.

A still further object of the present invention is to provide an improved end-closure on a shirred food casing which has built-in shock absorbing properties positive enough not to blow out at the start of the filling process.

These and other objects, features and advantages of the present invention will become more apparent from the following more detailed description.

SUMMARY OF THE INVENTION

The present invention provides for a method of forming an end-closure inside of the bore of a shirred strand of tubular casing, which comprises deshirring the terminal pleats of one end of the casing whereby the deshirred end is inverted into the bore of the strand where it is wound into a plug. The process of winding the deshirred end of the casing inside the bore in the form of a plug has the further effect of inverting and drawing into the interior of the bore end additional shirred casing wherein the internal walls formed from the additional casing are substantially cone or funnel shaped. That is, the internal walls are tapered so they converge with the end-closure plug. By recessing the plug into the bore of the strand it becomes less vulnerable to blow-out. This effect is complimented by the internal converging cone shaped walls which provide cushioning action, which collectively with the recessed plug provide a more dependable end-closure for shirred tubular casings.

The apparatus for making the centered and recessed end-closure described hereinabove comprises a mandrel which in one embodiment may comprise a rotatable, non-translatable gripping means for engaging a terminal end of the casing, inverting the terminal end inside the bore of the strand and for forming the end-closure or plug. The apparatus also includes a translatable, non-rotatable shaping and doffer means having a frontal nose section and a sleeve for the gripping means extending longitudinally therethrough. In order to impart a tapering effect to the walls of the shirred casing inverted into the bore, the shaping and doffer means is substantially cone shaped to allow at least partial entry into the bore of the shirred strand.

BRIEF DESCRIPTION OF THE DRAWINGS

For a further understanding of the invention, as well as the characterizing features, reference should now be made to the following detailed description thereof taken in conjunction with the accompanying drawings wherein:

FIG. 1 is a perspective view of a shirred tubular casing with a feed end of the casing before closure.

FIG. 2 is a perspective view of a shirred tubular casing with the end-closure formed according to the present invention.

FIG. 3 is an enlarged elevation of the feed end of a shirred casing before the end-closure is formed.

FIG. 4 is an enlarged elevation of the feed end of a shirred casing with the end-closure of the present invention.

FIG. 5 is an enlarged longitudinal section along line 5—5 of FIG. 4, showing the shirred strand with an end-closure according to the present invention.

FIG. 6 is a vector diagram showing the resistance to blow-out of the end-closure of the present invention.

FIG. 7 is a top plan of a machine for making the end-closure of the present invention.

FIG. 8 is an end view of the mandrel with rotatable and retractable gripper fingers.

FIG. 9 shows the mandrel with the fingers extended.

FIG. 10 shows the fingers retracted into the mandrel as when stripped from a just made end-closure in a shirred casing by the mandrel moving to the left.

FIG. 11 shows a modification of the apparatus for making end-closures wherein the mandrel is stationary and the fingers are both rotatable and retractable.

DESCRIPTION OF PREFERRED EMBODIMENTS

Figure 12:
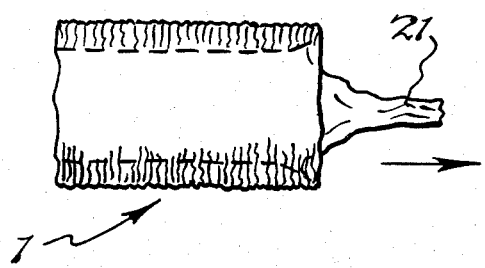
FIG. 12 is a shirred strand before the enclosure is formed with its terminal pleats deshirred by pulling outwardly.

Turning now to FIG. 1, there is illustrated a strand of tubular casing 1, including fore-end 3 after it has been shirred into multiple pleats, but without an end-closure having been formed therein. The tubular material is preferably collagen casing of the type used in the preparation of sausages, including frankfurters. This invention, however, is applicable to any shirred tubular material, such as tubular films of amylose, starch, polyvinyl alcohol, alginates, cellulose derivatives, gelatin, regenerated cellulose, casein, or plastic films like polystyrene, polyvinyl chloride, saran, polyethylene, polypropylene, polyesters, nylon, etc.

The structural features at the fore-end of the casing 1 before end-closure can best be viewed at FIG. 3, which shows shirred pleats forming the casing wall 5. The interior surface 9 of casing wall 5 defines an interior bore 7 of casing 1. FIG. 2 provides a view of the shirred casing having an end-closure 11 formed according to the present invention wherein pleats from casing wall 5 (FIG. 4) are inverted inwardly into the bore 7 to form inverted wall 13 best shown in FIG. 5. The inverted wall 13 of the casing, which is gradually tapered collectively forms a substantially cone or funnel shaped design is positioned at the strand terminus 15. Most preferably, the inverted wall 13 is formed into the shape of a truncated cone. The inverted wall is illustrated in FIG. 5 as being substantially pleated, uniform and symmetrical in configuration. It is to be understood that in many instances the process of making the end-closures herein will result in an inverted wall wherein the shirred pleats are stretched, distorted, or even deshirred, unlike the pleats forming casing wall 5 illustrated in FIG. 5.

The inverted wall 13 has its greatest diameter at the strand terminus 15 and gradually converges at the end-closure apex 17, which is centrally positioned in the interior of bore 7. Plug 19 of the end-closure commences at apex 17 comprises casing material wound a predetermined number of times so as to form an oval-like structure or plug. The deshirred terminal pleats 21 may be positioned in the interior of said plug. Optionally, but preferably the interior wall 23 of the plug 19 defines a passage 25 which allows for the removal of trapped air and other gases from bore 7 of the strand during filling operations.

The wall 23 of plug 19 is shown in FIG. 5 with pleats which are substantially uniform in shape and size corresponding to the pleats in tapered wall 13 and casing wall 5. Frequently, however, the pleats of wall 23 are disfigured and deshirred by the winding action of the gripping fingers of the end-closure apparatus of the present invention described in greater detail below. Thus, in many instances the pleats making up wall 23 are asymetrical, gathered and overlaped with one another to form the hollow plug 19. The diameter of plug 19 should not be greater than the diameter of the interior bore 7 of the strand. The entire end-closure plug 19 is positioned substantially in the center of the bore, and also situated at a point which is distal to the strand terminus 15.

FIG. 6 provides a vector diagram showing simulated inverted strand wall 13 wherein the inward, funnel shaped wall provides improved resistance, strength and shock absorbency properties from opposing forces, such as those generated during automated filling operations etc. This is achieved by positioning the end-closure plug at the apex of wall 13 inside the bore of the casing. The resistance to casing blow-out is actually enhanced by those forces acting against the direction of the inverted tapered walls and internally positioned plug. By comparison, positioning of the plug at the terminus 15 of casing 1 would result in a significant loss in resistance to blow-out and incidents of casing failure.

FIG. 7 discloses a plan for an apparatus for making the strand end-closures of the present invention. The casing end-closure apparatus 27 is shown mounted to base 35 and is generally comprised of mandrel 29, described in greater detail below, which is rotatably driven by motor 31 and reduction gear box 33 via drive shaft 43. Retraction of the mandrel 29 is effectuated by pneumatic cylinder 37 of conventional design, powered by compressed air channeled through lines 39 and 41. Translation of the mandrel 29 is achieved via yoke 45 through actuation of cylinder 37.

FIGS. 8-11 provide embodiments of mandrel 29, including relative operational movements of the same. Mandrel 29 includes gripping fingers 47 mounted to a finger shaft 55 which are secured to said shaft by means of a locking pin 57. The gripping fingers 47 are preferably comprised of parallel, spaced rods having outer oval surfaces. The gripping fingers 47 are shown as being spaced, however, the rods may be in juxtaposition making contact with each other. The gripping means may also include various other embodiments, including a single finger with spring loaded holding means, etc. The fingers 47 and shaft 55 are centrally positioned in mandrel 29 and extend longitudinally through a sleeve 59 and narrowed sleeve 61 (FIG. 10) of nose 51 of shaper and doffer 49, and is joined by conventional means to drive shaft 43 for rotational movement independently of shaper and doffer 49. The shaper and doffer 49 include the frontal nose section 51 having tapered side walls. The side walls of the nose section are funnel or substantially cone shaped, and more preferably, are in the form of a truncated cone. As shown in FIG. 8, the tapered side walls of the nose section 51 are generally smooth and free of elements which might otherwise grip or impede free movement of the casing sidewalls as they are inverted into the bore strand. The base of the cone shaped nose 51 is surrounded by a shoulder 53.

The shaper and doffer 49 of mandrel 29 which is mounted to yoke 45 for translation, either retraction (FIG. 9) or extension (FIG. 10) illustrate one preferred embodiment of the end-closure apparatus of the present invention. FIGS. 9 and 10 provide for an embodiment whereby the gripping fingers 47 and finger shaft 55 are rotatable, but non-translatable, whereas the shaper and doffer 49 is translatable, but non-rotatable. Thus, when gripping fingers 47 are rotating the shaper and doffer 49 is in a retracted position (FIG. 9). In order to strip the casing from the fingers after having completed its rotational cycle the shaper and doffer 49 of the end-closure apparatus is extended longitudinally (FIG. 10) resulting in the gripping fingers becoming withdrawn into narrowed sleeve 61 of said shaper and doffer.

An alternative embodiment of the mandrel 29 is illustrated in FIG. 11 wherein the shaper and doffer 49 is stationary and mounted to base plate 63. The gripping fingers 47 and finger shaft 55 are mounted for both longitudinal and rotational movement to shaft 43. Thus, fingers 47 and shaft 55 are translated outwardly at the initial winding cycle and retracted in order to doff the strand from the fingers at the completion of the end-closure cycle.

Figure 13:
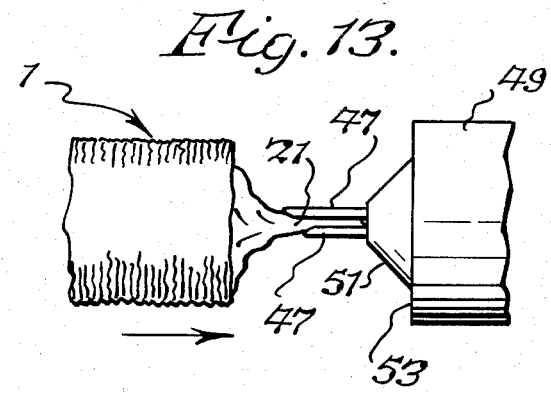
FIG. 13 shows the insertion of the deshirred casing into the space between the gripper fingers.
Figure 14:
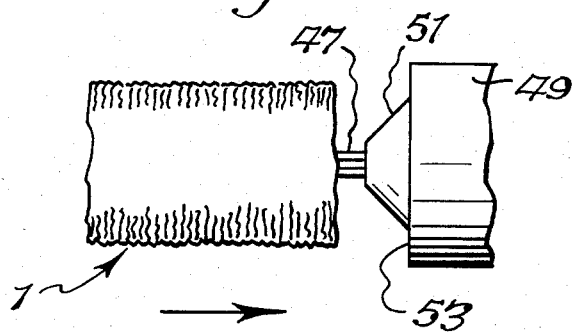
FIG. 14 is a view of the strand moving to the right so as to invert the deshirred casing into the bore of the strand.

FIGS. 12–17 illustrate the sequence of steps in making an end-closure according to the method of the present invention. FIG. 12 shows the end of a shirred strand 1 having its terminal pleats 21 in a deshirred form prior to attachment to the end-closure apparatus. The initial step of inserting the deshirred tab of casing 21 between the gripping fingers 47 is illustrated by FIG. 13 prior to advancing the casing over the nose section 51 of the shaper and doffer 49. Before the fingers 47 are rotated the casing with deshirred tab end 21 affixed thereto may be advanced manually so as to insert the same into the bore of strand (FIG. 14).

Figure 15:
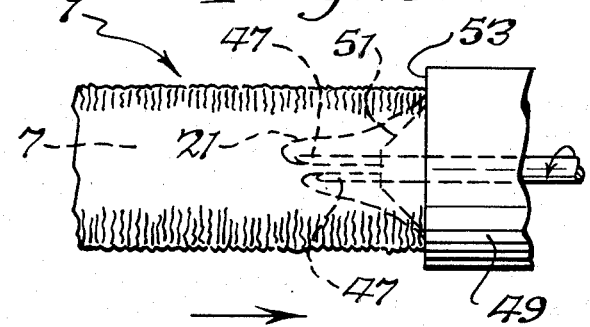
FIG. 15 is a view of the strand flush against the face of the mandrel.
Figure 16:
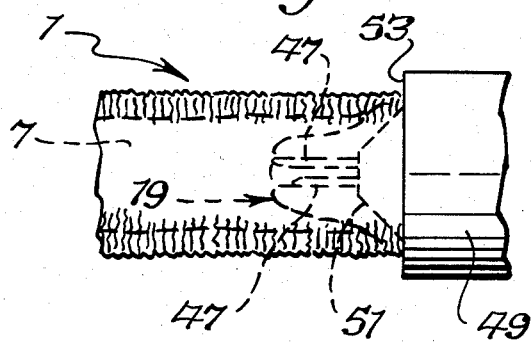
FIG. 16 shows the end-closure plug formed in the bore of the casing.
Figure 17:
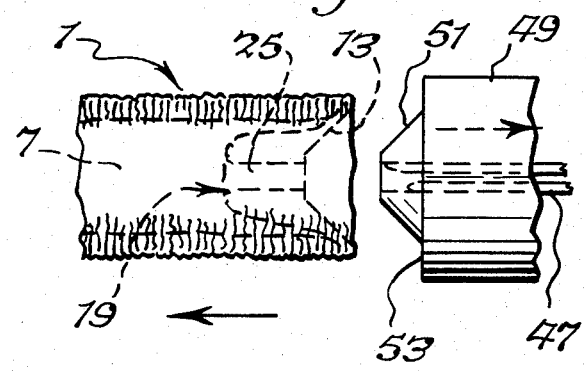
FIG. 17 illustrates the completed end-closure by retraction of the gripper fingers or by movement of the mandrel toward the left.

FIG. 15 provides a view of the fingers fully extended into the bore 7 of shirred strand 1 with deshirred casing 21 connected to fingers 47. The tapered nose section 51 at this stage of the end-closure process operates as a guide enabling the operator to position the end-closure plug, yet to be formed, in the center of the bore of the strand. The strand is advanced so the shirred walls are held flush with shoulder 53 of the shaper and doffer 49, which is in fully retracted position. Fingers 47 are then rotated a sufficient number of times to wind the inverted casing into a plug 19, which should preferably have a diameter smaller than that of bore 7. The winding action also has the effect of drawing additional shirred casing inwardly by inverting the walls of the strand inside the bore. The nose section 51, thus operates to mold the walls of the additional inverted casing into a tapered configuration 13 (FIG. 17).

At the completion of the winding cycle the shaper and doffer 49 may be extended longitudinally to strip the casing from the end-closure apparatus or alternatively, the fingers 47 may be withdrawn in either instance to provide an end-closure 19 having tapered walls 13 and an air passage 25.

In operation, the terminal pleats of a shirred casing are manually withdrawn from the strand and inserted by the operator between the gripping fingers 47 of the mandrel while the strand end is held axially thereto. The strand is then advanced over the nose section 51 until the side wall of the casing is flush with shoulder 53 of the shaper and doffer 49. The deshirred terminal pleats 21 are thereby inverted into the bore of the strand. The tapered wall of the nose section 51 centers the gripping fingers in the bore of the strand without resorting to an aligning plate. It is to be understood that the air cylinder 37 of the end-closure apparatus at this stage is in a retracted position placing the shaper and doffer in a rearward position exposing the gripping fingers of the mandrel.

Motor 31 is actuated by a foot operated switch of conventional design (not shown) which through reduction gearing 33 rotates driveshaft 43, shaft 55 and gripping fingers 47 approximately 8 to 10 turns forming a plug by wrapping casing material around fingers 47. This action also causes shirred casing from the strand to be inverted and drawn inwardly into the bore forming walls which conform to the shape of the nose section 51. At the completion of the rotational cycle, the motor of the end-closure apparatus ceases operation whereupon the air cylinder 37 is actuated extending piston rod 36 longitudinally. This action translates the shaper and doffer 49 by way of yoke 45 stripping the end closure plug from the fingers 47 without unwinding or damaging the same.

Although the invention has been described in considerable detail with respect to the preferred embodiments thereof, it will be apparent that the invention is capable of numerous modifications and variations to those skilled in the art without departing from the spirit and scope of the invention, as defined in the claims.

What is claimed is:

1. A method of forming an end-closure inside the bore of a shirred strand of tubular casing, which comprises deshirring the terminal pleats of one end of the strand, inverting the deshirred casing into the bore of the strand, winding the deshirred casing inside the bore into an end-closure plug, and inverting shirred casing into the bore as the plug is formed wherein the walls of the inverted casing immediately adjacent to the end of the strand are tapered and remain substantially pleated.

2. The method of claim 1 wherein the walls of the inverted casing are substantially cone shaped.

3. The method of claim 1 wherein the walls of the inverted casing are substantially that of a truncated cone.

4. The method of claim 3 wherein the end-closure plug is positioned at the apex of the cone.

5. The method of claim 1 wherein the end-closure plug is positioned substantially in the center of the bore.

6. The method of claim 5 wherein the end-closure plug includes an escape passage for entraped gases.

7. The method of claim 1 wherein the tubular casing is formed from edible collagen.

8. The method of claim 1 wherein the tubular casing is formed from regenerated cellulose.

9. A sausage casing having an end-closure made according to the method of claim 4.

10. A sausage casing having an end-closure made according to the method of claim 6.

11. A sausage casing having an end-closure made according to the method of claim 7.

12. A sausage casing having an end-closure made according to the method of claim 1.

13. An apparatus for forming an end-closure inside the bore of a shirred strand of tubular casing comprising:
- a rotatable, translatable gripping means for engaging a terminal end of the casing, inverting the terminal end inside the bore of the strand and for forming an end-closure plug, and
- a shaping and doffer means having a frontal nose section and a sleeve for the gripping means extending longitudinally therethrough, the frontal nose section being tapered for at least partial entry into the bore of the shirred strand without gripping the terminal end of the casing.

14. The end-closure apparatus of claim 13 wherein the shaping and doffer means includes a shoulder adjacent to the base of the frontal nose section.

15. The end-closure apparatus of claim 14 wherein the gripping means comprises a plurality of fingers projecting axially from the nose section of the shaping and doffer means.

16. The end-closure apparatus of claim 13 wherein the nose section of the shaping and doffer means is substantially cone shaped.

17. The end-closure apparatus of claim 13 wherein the nose section of the shaping and doffer means is a truncated cone.

18. An apparatus for forming an end-closure inside the bore of a shirred strand of tubular casing comprising:
- a rotatable, non-translatable gripping means for engaging a terminal end of the casing, inverting the terminal end inside the bore of the strand and for forming an end-closure plug, and
- a translatable, non-rotatable shaping and doffer means having a frontal nose section and a sleeve for the gripping means extending longitudinally therethrough, the frontal nose section being tapered for at least partial entry into the bore of the shirred strand without gripping the terminal end of the casing.

19. The end-closure apparatus of claim 18 wherein the nose section of the shaping and doffer means is substantially cone shaped.

20. The end-closure apparatus of claim 18 wherein the nose section of the shaping and doffer means is a truncated cone.

21. The end-closure apparatus of claim 18 wherein the shaping and doffer means includes a shoulder adjacent to the base of the frontal nose section.

22. The end-closure apparatus of claim 21, wherein the gripping means comprises a plurality of fingers projecting axially from the nose section of the shaping and doffer means.

* * * * *